J. C. EUBANK.
PNEUMATIC TIRE.
APPLICATION FILED AUG. 23, 1916.
1,311,883. Patented Aug. 5, 1919.
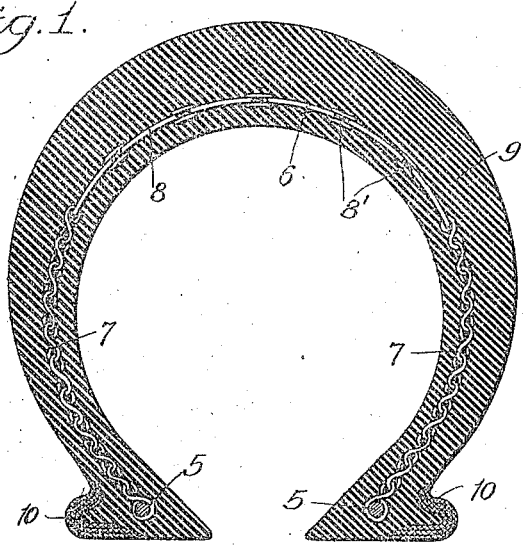
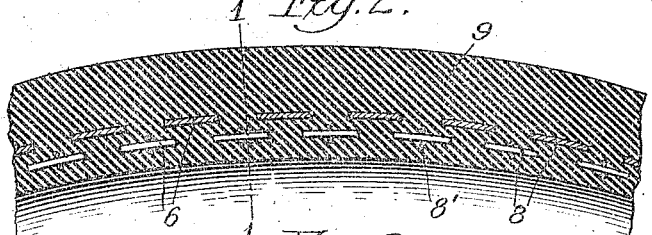
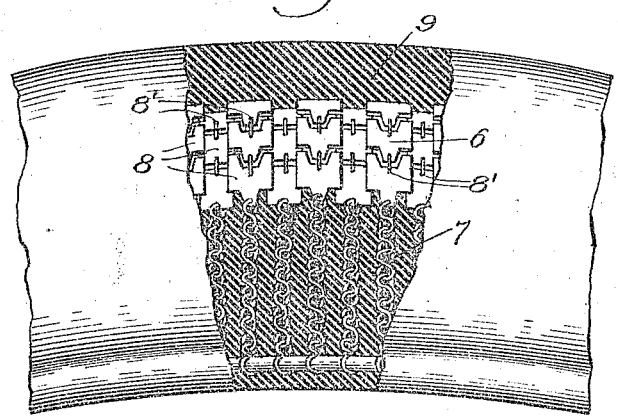
Witness
John Enders
Inventor:
Judson C. Eubank
by
F. A. Gerlach
his Atty.

UNITED STATES PATENT OFFICE.

JUDSON C. EUBANK, OF CHICAGO, ILLINOIS.

PNEUMATIC TIRE.

1,311,883.  Specification of Letters Patent.  Patented Aug. 5, 1919.

Application filed August 23, 1916. Serial No. 116,454.

*To all whom it may concern:*

Be it known that I, JUDSON C. EUBANK, a citizen of the United States, and a resident of Chicago, in the county of Cook and State of Illinois, have invented certain new and useful Improvements in Pneumatic Tires, of which the following is a full, clear, and exact description.

The invention relates to pneumatic tires and more particularly to casings for containing the air tubes.

In pneumatic tire-casings as now usually constructed, the carcass or supporting structure for the rubber covering is built up of layers of canvas fabric and in some instances a metallic base-reinforcement. It has also been heretofore proposed to embed a protective metallic armor in the casing, the fabric, however, being relied upon primarily to resist the pressure of the air in the tube and hold the casing to its form. In practice, it has been found that the fabric deteriorates from heat developed in the tire and if punctured or cut, the surrounding portion of the tire is weakened so that the casing will soon become inoperative. In other words, the life of the tire is usually equal to the period during which the canvas carcass remains intact and until it deteriorates to such extent that it is insufficient to withstand the air pressure and stresses of use.

The primary object of the present invention is to provide a tire in which the use of a canvas carcass will be dispensed with and in which the carcass consists essentially of jointed or linked metallic members anchored to the base-reinforcement and is organized so as to wholly support the rubber covering without interfering with the resiliency of the tire. In other words, to provide a pneumatic tire casing in which canvas fabric as a supporting constituent of the carcass or supporting structure for the rubber covering is dispensed with and the carcass or supporting-structure for the rubber will be composed wholly of metallic elements.

This object is attained by a carcass composed of flexible metallic transversely extending chains anchored to the base reinforcing bands, distributed throughout the rubber covering to support all portions thereof and spaced apart to permit flexure of all parts of the casing so that canvas fabric as a part of the carcass will be unnecessary.

A further object of the invention is to provide an improved tire casing which is durable and efficient in use.

The invention consists in the several novel features hereinafter set forth and more particularly defined by claims at the conclusion hereof.

In the drawings: Figure 1 is a transverse section taken on line 1—1 of Fig. 2 of a pneumatic tire casing embodying the invention. Fig. 2 is a longitudinal section of the metal carcass or metallic structure embedded in the rubber. Fig. 3 is a side elevation, a portion of the rubber covering being shown in section.

The carcass of the tire comprises annular base-reinforcement 5 at each side of the base of the tire, usually in the form of a metal cable or wires, and metallic transverse connecting members 6 between the reinforcement 5. Each transverse carcass member comprises lengths of metallic link chains 7 at the sides of the tire respectively, and a series of metallic tread plates 8 extending between and connected to the outer ends of the chain-sections 7. The transverse metallic carcass members are longitudinally independent of one another except for the rubber in which they are embedded or metallically unattached. The entire carcass is embedded in a covering of rubber or rubber compound 9 which in cross section is of the form and size of the casing desired and extends around substantially all portions of the metallic carcass. The side portions 7 of the carcass members 6 are disposed sufficiently close together to support the rubber on and between them under maximum stresses and are separated sufficiently to leave the sides of the casing free to flex responsively to external pressure and to internal pressure under limit of the carcass. The plates 8 forming the tread or connecting portions of the transverse members are sufficiently wide to lap one another longitudinally and are serially connected by link 8'. Each transverse series of plates is independent of the longitudinally contiguous plates, the alternating transverse members 6 having their tread plates embedded in the rubber at different heights so that there will be rubber between substantially all portions of one transverse member and all portions of adjacent transverse members. As a result of leaving the transverse reinforcing members independent of one another, the rubber in which the carcass is embedded will readily permit flexure of the tread portion. The purpose of employing lapped plates is to protect the tread portion of the casing against puncture or cuts.

In manufacturing the improved tire, a suitable tire-form is first covered with sufficient rubber to prevent any portion of the metallic carcass from being exposed where it might rub against the inner tube. Next, the entire carcass consisting of the base-reinforcement and transverse members is placed in the rubber on the form. Then, the remainder of the tire is built up of rubber so as to cover the carcass and form the tread and sides of the tire in the desired cross-sectional shape. The entire casing is then vulcanized to unite the metallic carcass and rubber. If the tire is of the clencher type, a bead 10 of canvas or other suitable material may be formed at each side of the base reinforcement 5.

The invention exemplifies a pneumatic tire casing in which substantially the entire carcass or supporting structure for the rubber around the carcass consists of flexibly connected metallic members and as a result, the use of canvas or fabric as an essential supporting constituent for the rubber is avoided. The invention exemplifies a tire which is more durable than those in which a canvas carcass is used, because the canvas is deteriorated by heat while the metallic members are not affected thereby. The invention further exemplifies a casing in which substantially the entire carcass is metallic and which comprises members extending transversely between the annular base reinforcement which are longitudinally independent or metallically disconnected to permit local flexure of the tire. The invention also exemplifies a tire which is simple in construction and can be produced at a low cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a pneumatic tire casing, the combination of a carcass comprising annular base members, transverse metallic members having their ends anchored to the base members and comprising flexibly joined links extending around the sides and tread, and a rubber body in which the transverse members are directly completely and individually embedded, said transverse members being spaced apart and disposed to support substantially all portions of the rubber covering without fabric reinforcement.

2. In a pneumatic tire casing, the combination of a carcass comprising annular base-members, transverse metallic members anchored to the base-members comprising joined links and extending around the sides and tread, said transverse members being longitudinally independent and spaced apart at the tread, and a rubber body in which the transverse members are completely and directly embedded and filling the spaces between the transverse members, the body being supported in substantial entirety by and on the carcass to support it without fabric reinforcement, the tread portions of alternate transverse members being alternately arranged and disposed inwardly and outwardly of one another, the body extending between said tread-portions.

JUDSON C. EUBANK.